United States Patent
Eno et al.

(10) Patent No.: US 10,922,174 B2
(45) Date of Patent: *Feb. 16, 2021

(54) SELECTIVE ERROR RATE INFORMATION FOR MULTIDIMENSIONAL MEMORY

(71) Applicant: Micron Technology, Inc., Boise, ID (US)

(72) Inventors: Justin M. Eno, El Dorado Hills, CA (US); Samuel E. Bradshaw, Sacramento, CA (US)

(73) Assignee: Micron Technology, Inc., Boise, ID (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/406,775

(22) Filed: May 8, 2019

(65) Prior Publication Data
US 2019/0266047 A1 Aug. 29, 2019

Related U.S. Application Data

(63) Continuation of application No. 15/472,957, filed on Mar. 29, 2017, now Pat. No. 10,318,381.

(51) Int. Cl.
*G06F 11/07* (2006.01)
*G06F 11/10* (2006.01)

(52) U.S. Cl.
CPC .................................. *G06F 11/108* (2013.01)

(58) Field of Classification Search
CPC .......................... G06F 11/1068; G06F 11/0793
(Continued)

(56) References Cited

U.S. PATENT DOCUMENTS 5,812,435 A 9/1998 Fujinaga
9,478,315 B2 10/2016 Yang et al.
(Continued)

OTHER PUBLICATIONS

International Search Report and Written Opinion from related International application No. PCT/US2018/023227, dated Jul. 30, 2018, 13 pages.
(Continued)

*Primary Examiner* — Chae M Ko
(74) *Attorney, Agent, or Firm* — Brooks, Cameron & Huebsch, PLLC

(57) ABSTRACT

A memory device can include three-dimensional memory entities each including a plurality of two-dimensional memory entities. A controller can read data from the memory at a first resolution and collect error rate information from the memory at a second resolution including a portion of a two-dimensional memory entity. The controller can determine a quantity of two-dimensional memory entities that have a greater error rate than a remainder of the two-dimensional memory entities based on the error rate information. The controller can determine a quantity of portions of three-dimensional memory entities that have a greater error rate than a remainder of the portions of three-dimensional memory entities based on the error rate information excluding error rate information for portions of the two-dimensional memory entities associated with the quantity of two-dimensional memory entities. The controller can cull the quantity of the two-dimensional memory entities and the quantity of the three-dimensional memory entities.

20 Claims, 7 Drawing Sheets

(58) Field of Classification Search
USPC .......................................................... 714/6.11
See application file for complete search history.

(56) References Cited

U.S. PATENT DOCUMENTS

| | | | |
|---|---|---|---|
| 9,530,469 B2 | 12/2016 | Kitagawa et al. | |
| 2005/0149819 A1 | 7/2005 | Hwang | |
| 2008/0098280 A1 | 4/2008 | Andersen | |
| 2010/0332895 A1 | 12/2010 | Billing et al. | |
| 2012/0226963 A1* | 9/2012 | Bivens | G11C 29/76 |
| | | | 714/773 |
| 2013/0024735 A1* | 1/2013 | Chung | G06F 11/1048 |
| | | | 714/704 |
| 2014/0258796 A1 | 9/2014 | Ghaly et al. | |
| 2015/0067415 A1* | 3/2015 | Miyamoto | G06F 11/073 |
| | | | 714/704 |
| 2015/0074333 A1* | 3/2015 | Yao | G06F 12/0246 |
| | | | 711/103 |
| 2015/0194224 A1 | 7/2015 | Jeddeloh | |
| 2015/0348649 A1 | 12/2015 | Yang et al. | |
| 2015/0378801 A1 | 12/2015 | Navon | |
| 2016/0148708 A1 | 5/2016 | Tuers et al. | |
| 2016/0172034 A1 | 6/2016 | Oh et al. | |
| 2016/0224267 A1 | 8/2016 | Yang et al. | |
| 2016/0299812 A1 | 10/2016 | Olbrich et al. | |
| 2017/0140825 A1 | 5/2017 | Park et al. | |
| 2017/0294237 A1 | 10/2017 | Li et al. | |

OTHER PUBLICATIONS

Office Action from related Taiwanese patent application No. 107110634, dated Dec. 6, 2018, 11 pages.

* cited by examiner

SELECTIVE ERROR RATE INFORMATION FOR MULTIDIMENSIONAL MEMORY

PRIORITY INFORMATION

This application is a Continuation of U.S. application Ser. No. 15/472,957 filed Mar. 29, 2017, the contents of which are included herein by reference.

TECHNICAL FIELD

The present disclosure relates generally to semiconductor memory and methods, and more particularly, to selective error rate information for multidimensional memory.

BACKGROUND

Memory devices are typically provided as internal, semiconductor, integrated circuits in computing systems or other electronic devices. There are many different types of memory including volatile and non-volatile memory. Volatile memory can require power to maintain its data (e.g., user data, error data, etc.) and includes random-access memory (RAM), dynamic random access memory (DRAM), synchronous dynamic random access memory (SDRAM), and hybrid memory cube (HMC), among others. Non-volatile memory can provide persistent data by retaining stored data when not powered and can include non-volatile random access memory (NVRAM), NAND flash memory, NOR flash memory, read only memory (ROM), Electrically Erasable Programmable ROM (EEPROM), Erasable Programmable ROM (EPROM), and resistance variable memory such as phase change random access memory (PCRAM), 3D Phase Change Material and Switch (PCMS), resistive random access memory (RRAM), and magnetoresistive random access memory (MRAM), such as spin torque transfer random access memory (STT RAM), among others.

Memory devices can be combined together to form a storage volume of a memory system such as a solid state drive (SSD). A solid state drive can include non-volatile memory (e.g., 3D PCMS, NAND flash memory and/or NOR flash memory), and/or can include volatile memory (e.g., DRAM and/or SRAM), among various other types of non-volatile and volatile memory.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile 3D PCMS memory to create SSDs that may not use an internal battery supply, thus allowing the drive to be more versatile and compact.

DETAILED DESCRIPTION

Figure 1:
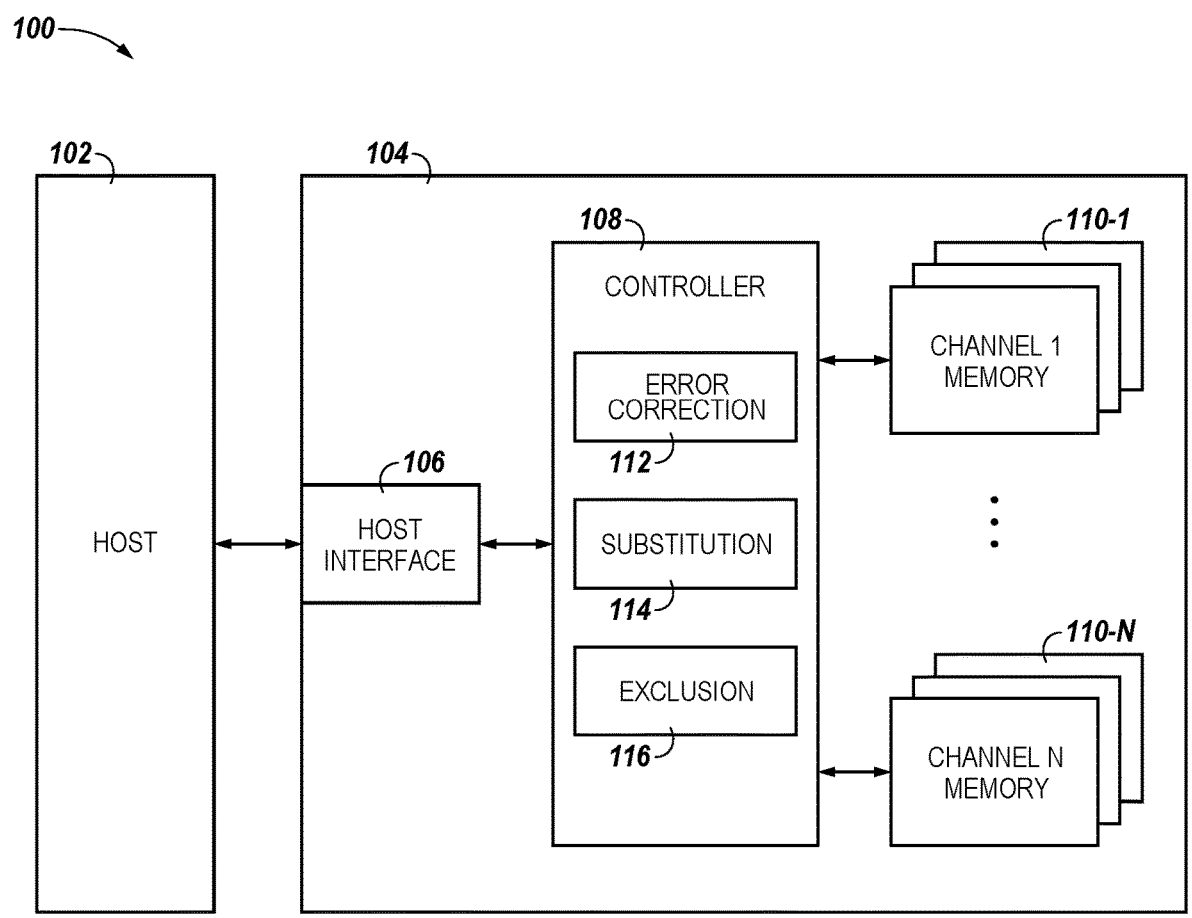
FIG. 1 is a block diagram of an apparatus in the form of a computing system including at least one memory system in accordance with the present disclosure.

The present disclosure is related to selective error rate information for multidimensional memory. The dimensionality of memory is described in more detail with respect to FIG. 2. As used herein, multidimensional memory implies both a physical and logical dimensionality greater than two physical and logical dimensions.

Identifying particular entries in a composite group given separate selection criteria for different views of that group can be challenging. This challenge can be manifested with respect to error management of multidimensional memory. In particular, it can be manifested in a mechanism used to identify error-prone portions of the media to cull from a pool of candidate regions available to store data. The terms "cull" and "exclude" are generally used interchangeably herein. The present disclosure can address this challenge by applying layered filtering in an efficient manner. The efficiency stems from the fact that intersecting filter domains can share accumulators and therefore filter domains need not be tabulated independently. Furthermore, filtering a given domain is not contingent upon full manifestation of a preceding filter operation.

As a more specific example, according to at least one embodiment of the present disclosure, a memory device can include three-dimensional memory entities each including a plurality of two-dimensional memory entities. A controller can read data from the memory at a first resolution and collect error rate information from the memory at a second resolution including a portion of a two-dimensional memory entity. The controller can determine a quantity of two-dimensional memory entities that have a greater error rate than a remainder of the two-dimensional memory entities based on the error rate information. The controller can determine a quantity of portions of three-dimensional memory entities that have a greater error rate than a remainder of the portions of three-dimensional memory entities based on the error rate information excluding error rate information for portions of the two-dimensional memory entities associated with the quantity of two-dimensional memory entities. The controller can cull the quantity of the two-dimensional memory entities and the quantity of the three-dimensional memory entities.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "D", "E", "M", "N", "P", "S", and "T", particularly with respect to reference numerals in the drawings, indicates that a number of the particular feature so designated can be included. As used herein, "a number of" a particular thing can refer to one or more of such things (e.g., a number of memory devices can refer to one or more memory devices). As used herein, the terms "first" and "second" are used to differentiate between one feature from another and do not necessarily imply an order between the features so designated.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 604 in FIG. 6. Multiple analogous elements within one figure may be referenced with a reference numeral followed by a hyphen and another numeral or a letter. For example, 110-1 may reference element 10-1 in FIGS. 1 and 110-N may reference element 10-N, which can be analogous to element 110-1. Such analogous elements may be generally referenced without the hyphen and extra numeral or letter. For example, elements 110-1, ..., 110-N may be generally referenced as 110. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus in the form of a computing system 100 including at least one memory system 104 in accordance with the present disclosure. As used herein, a memory system 104, a controller 108, or a memory device 110 might also be separately considered an "apparatus." The memory system 104 can be a solid state drive (SSD), for instance, and can include a host interface 106, a controller 108 (e.g., a processor and/or other control circuitry), and a number of memory devices 110-1, ..., 110-N (e.g., solid state memory devices such as 3D PCMS memory devices), which provide a storage volume for the memory system 104.

As illustrated in FIG. 1, the controller 108 can be coupled to the host interface 106 and to the memory devices 110 via a plurality of channels and can be used to transfer data between the memory system 104 and a host 102. The interface 106 can be in the form of a standardized interface. For example, when the memory system 104 is used for data storage in a computing system 100, the interface 106 can be a serial advanced technology attachment (SATA), peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106.

Host 102 can be a host system such as a personal laptop computer, a desktop computer, a digital camera, a mobile telephone, or a memory card reader, among various other types of hosts. Host 102 can include a system motherboard and/or backplane and can include a number of memory access devices (e.g., a number of processors).

The controller 108 can communicate with the memory devices 110 to control data read, write, and erase operations, among other operations. Although not specifically illustrated, in some embodiments, the controller 108 can include a discrete memory channel controller for each channel coupling the controller 108 to the memory devices 110. The controller 108 can include, for example, a number of components in the form of hardware and/or firmware (e.g., one or more integrated circuits) and/or software for controlling access to the number of memory devices 110 and/or for facilitating data transfer between the host 102 and memory devices 110.

The memory devices 110 can include a number of arrays of memory elements (e.g., memory cells). For example, the memory devices 110 can be 3D PCMS memory devices including memory elements arranged in tiles, where sub-tiles are portions of the tiles, where a slice is an aggregation of tiles, and where a sub-slice is a portion of a slice. However, embodiments are not limited to a particular type of memory array or array architecture.

In operation, data can be written to and/or read from a memory device of a memory system (e.g., memory devices 110 of system 104) as a physical page of data, for example. As one example, a 3D PCMS memory device may be configured to store a particular quantity of bytes of data per page, which can be one bit from each of the quantity of tiles in a slice. As such, a physical page of data can be referred to as a data transfer size of the memory system. Data can be transferred to/from a host (e.g., host 102) in data segments referred to as sectors (e.g., host sectors). As such, a sector of data can be referred to as a data transfer size of the host. A sector of data is a logical granularity that can be remapped to a variety of different underlying system granularities.

In some embodiments, and as illustrated in FIG. 1, the controller 108 can include an error correction component 112 (e.g., an error coder such as an error correction code (ECC) engine), a substitution component 114, and an exclusion component 116. Each of the error correction component 112, the substitution component 114, and the exclusion component 116 can be discrete components such as an application specific integrated circuit (ASIC) or the components may reflect functionally provided by circuitry within the controller 108 that does not necessarily have a discrete physical form separate from other portions of the controller 108. Although illustrated as components within the controller 108 in FIG. 1, each of the error correction component 112, the substitution component 114, and the exclusion component 116 can be external to the controller 108 or have a number of components located within the controller 108 and a number of components located external to the controller 108. For example, the error correction component 112 can include a number of error correction coding circuits located on the controller 108 and a number of error correction coding circuits located external to the controller 108. Although various functions may be described with respect to the error correction component 112, the substitution component 114, and/or the exclusion component 116, the various functions may equally be said to be performed by the controller 108. The controller 108 can be configured to perform error management such as error correction, memory entity substitution, and/or memory entity exclusion.

The error correction component 112 can be configured to collect error information, such as raw bit error rate (RBER) information, for the memory apparatus (e.g., for the memory devices 110). For example, the error information can be collected after a reading pass of an error scrubber associated with the error correction component 112. As described in more detail below, the error information can be collected at different resolutions for different types of memory devices. The resolution can be a portion of a two-dimensional memory entity, where the two-dimensional memory entity itself is a portion of a three-dimensional memory entity. For example, the resolution can be a sub-tile resolution for a 3D PCMS memory device.

The error correction component 112 can be configured to perform error correction coding of data as codewords. A codeword can have a total size that includes a wrapper and a payload. The codeword payload can refer to the data (e.g., user data) that is encoded within the codeword. The codeword wrapper can refer to the error information that is encoded in the codeword along with the user data. As an example for embodiments including 3D PCMS memory devices, multiple logical and/or physical pages can be error correction coded together as a codeword. The codeword can be stored as physical pages of data in a plurality of sub-slices of the 3D PCMS device (e.g., as one or more physical pages of data per sub-slice). The error correction component can be configured to perform error correction of codewords read from the memory devices 110.

The memory devices 110 can include spare memory entities such as spare tiles and/or sub-slices for a 3D PCMS device. As a non-limiting example, 1/16 of the sub-slices on a memory die can be reserved as spares. The substitution component 114 can be configured to substitute spare memory entities for other memory entities that are identified as being error-prone as part of an error management process. With respect to 3D PCMS devices, the substitution component 114 can be configured to perform tile substitution of spare tiles for the quantity of tiles. The substitution component 114 can be configured to perform sub-slice substitution of spare sub-slices for the quantity of sub-slices. However, in some embodiments, the substitution component 114 can be configured such that sub-slices are not able to be substituted individually.

The exclusion component 116 can be configured to exclude memory entities based on collected error rate information. Such a process of error management can efficiently identify and exclude the worst offender memory entities in terms of errors. When aggregate error rates in an address group (e.g., a sub-slice) exceed the fixed correction capability of the error correction component 112 and the substitution component 114, that group can be culled from the pool of media. The pool of media may have various objectives, such as maintaining data integrity, maintaining or improving quality of service, reducing latency, trigger rate management, etc. With respect to 3D PCMS devices, the exclusion component 116 can be configured to perform tile exclusion for a quantity of tiles that have a greater error rate than a remainder of the tiles based on error rate information collected for sub-tiles associated with the quantity of tiles. The exclusion component 116 can be configured to perform sub-slice exclusion for a quantity of sub-slices that have a greater error rate than a remainder of the sub-slices based on error rate information collected for sub-tiles associated with the quantity of sub-slices. The error rate information upon which the sub-slice exclusion is based can exclude error rate information for sub-tiles associated with the quantity of tiles.

Figure 2:
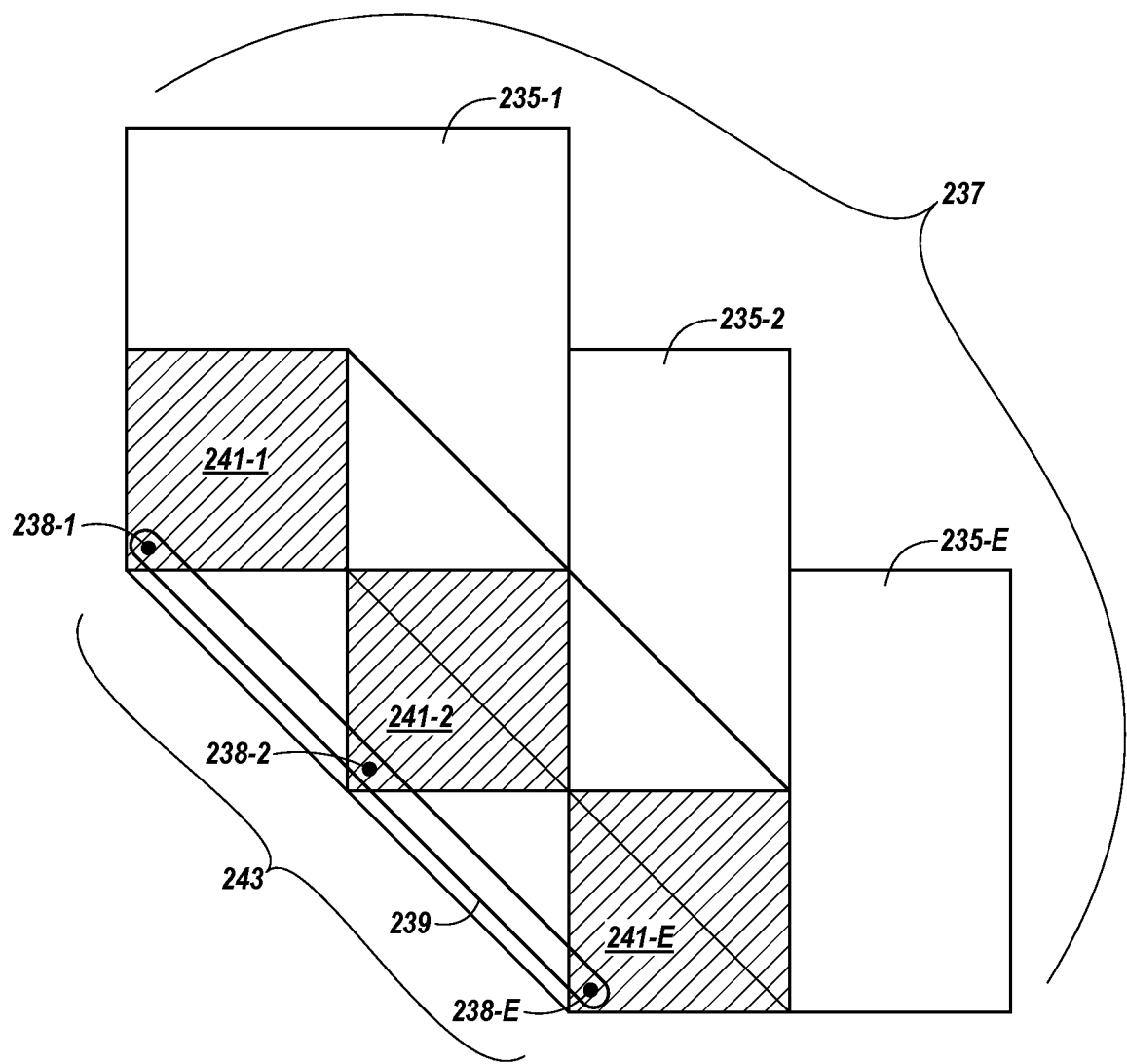
FIG. 2 is a block diagram of an apparatus in the form of a memory device in accordance with the present disclosure.

FIG. 2 is a block diagram of an apparatus in the form of a memory device in accordance with the present disclosure. The memory device can be analogous to the memory devices 110 illustrated in FIG. 1. The memory device can include three-dimensional memory entities, such as the three-dimensional memory entity 237 illustrated in FIG. 2. The three-dimensional memory entity can include a plurality of two-dimensional memory entities 235-1, 235-2, . . . , 235-E. The two-dimensional memory entities 235 can be arrays of memory elements such as memory cells, although only one respective memory element 238-1, 238-2, . . . , 238-E is illustrated for each two-dimensional memory entity 235. The two-dimensional memory entities 235 can be physical memory entities such as dice or chips that include an array of memory elements. The two-dimensional memory entities are referred to as being two-dimensional because they are of a lesser dimension than the three-dimensional memory entity 237. Although the two-dimensional memory entities 235 are three-dimensional physical objects, they are referred to as being two-dimensional because a group of two-dimensional memory entities 235 can form a memory entity of a higher dimension, which is referred to as a three-dimensional memory entity 237. The two-dimensional memory entities may include more than one planar array of memory cells.

The two-dimensional memory entities 235 are referred to as being two-dimensional because they are of a greater dimension than a memory element. The two-dimensional memory entities 235 include a plurality of memory elements arranged in at least two physical dimensions (e.g., at least one memory array). The memory elements individually can be referred to as one-dimensional memory elements (again, even though they exist as three-dimensional physical objects). A grouping of a plurality of three-dimensional memory elements 237 can be referred to as a four-dimensional memory element (not specifically illustrated in FIG. 2). A grouping of a plurality of four-dimensional memory elements can be referred to as a five-dimensional memory element, etc.

Although not specifically illustrated in FIG. 2, the memory device can be coupled to a controller (e.g., the controller 108 in FIG. 1). The controller can be configured to read data from the memory device at a first resolution 239. The first resolution 239 can be referred to as a page of data. In some embodiments, the first resolution 239 can include a respective memory element 238-1, 238-2, . . . , 238-E from each two-dimensional memory entity 235-1, 235-2, . . . , 235-E contained within a selected three-dimensional memory entity 237. The controller can be configured to write data to the memory device at the first resolution.

The controller can be configured to collect error rate information from the memory device at a second resolution 241. FIG. 2 includes an illustration of a respective example of the second resolution 2421-1, 241-2, . . . , 241-E for each of the two-dimensional memory elements 235. The second resolution 241 can be a portion of a two-dimensional memory entity 235. For example, the second resolution 241-1 illustrated in association with the two-dimensional memory entity 235-1 is a portion thereof. Although the second resolution 241 is illustrated as being a quarter of the two-dimensional memory entity 235, embodiments are not limited to any particular portion. Error information can be collected for any or all portions of the memory device, however collecting error rate information at the second resolution 241 means that the granularity with which the error information is stored and accessible is at the second resolution 241 (e.g., RBER per sub-tile for a 3D PCMS device). Collectively, the portions of the two-dimensional memory entities 235 corresponding to the second resolution 241 make up a portion 243 of the three-dimensional memory entity 237. For example, in the case of 3D PCMS memory, the two-dimensional memory entities 235 can be tiles, the three dimensional memory entities 237 can be slices, the portion 243 of the three-dimensional memory entity 237 can be a sub-slice, and the portions of the two-dimensional memory entities 235 corresponding to the second resolution 241 can be sub-tiles (see FIGS. 3-6).

As described above, the memory apparatus can include spare memory entities such as spare two-dimensional memory entities 235 and/or three-dimensional memory entities 237. The spare memory entities can be used as substitutes for other memory entities that are identified as being error-prone as part of an error management process. Furthermore, memory entities, or portions thereof can be culled from use. Because the memory entities are of different dimensionalities, it can be challenging to determine which memory entities to exclude where the error data is collected at a particular resolution.

The controller can be configured to determine a quantity of two-dimensional memory entities 235 that have a greater error rate than a remainder of the two-dimensional memory entities 235 based on the error rate information. The error rate information is collected at the second resolution 241 and can be summed for each two-dimensional memory entity 235 to which it pertains. The controller can be configured to determine a quantity of portions 243 of three-dimensional memory entities 237 that have a greater error rate than a remainder of the portions of three-dimensional memory entities based on the error rate information excluding error rate information for portions of the two-dimensional memory entities 235 associated with the quantity of two-dimensional memory entities 235. The controller can be configured to cull the quantity of two-dimensional memory entities 235 and the quantity of three-dimensional memory entities 237 from the memory apparatus. The two-dimensional memory entities 235 and the portions 243 of the three-dimensional memory entities 237 are orthogonal entities that are considered independently in the error management process.

Figure 3:
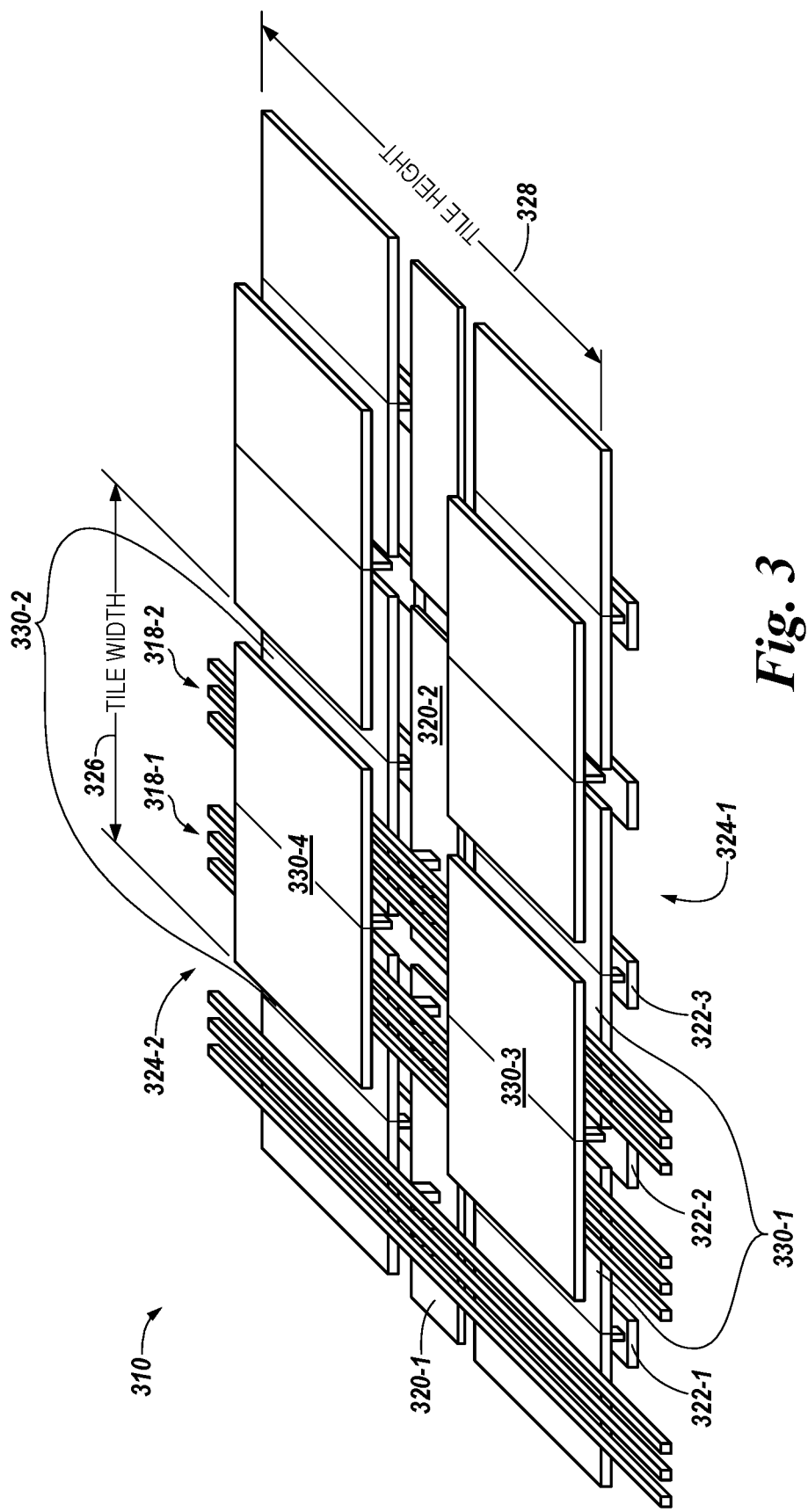
FIG. 3 is a block diagram of an apparatus in the form of a memory device in accordance with the present disclosure.

FIG. 3 is a block diagram of an apparatus in the form of a memory device 310 in accordance with the present disclosure. The memory device 310 can be analogous to the memory devices 110 illustrated in FIG. 1. In the embodiment illustrated in FIG. 3, the memory device 310 is a 3D Phase Change Material and Switch (PCMS) memory device. A 3D PCMS memory device is an example of a multidimensional memory device.

A 3D PCMS device can include memory elements having a "stack" structure. A memory element can comprise a switch element and a storage element (e.g., a switch element coupled in series with a storage element). The switch element can be a diode, field effect transistor (FET), a bipolar junction transistor (BJT), an ovonic memory switch (OMS), or an ovonic threshold switch (OTS), among others. In a number of embodiments, the memory element can comprise a memory material that can serve as both the storage element and the memory element, and which may be referred to herein as a switch and storage material (SSM). An SSM may comprise a chalcogenide alloy; however, embodiments are not so limited.

In a number of embodiments, the switch element and storage element associated with the respective memory cells can be series coupled two-terminal devices. For instance, the switch element can be a two-terminal OTS (e.g., a chalcogenide alloy formed between a pair of electrodes), and the storage element can be a two-terminal phase change storage element (e.g., a Phase Change Material (PCM) formed between a pair of electrodes). A memory cell including an OTS in series with a PCM can be referred to as a PCMS memory cell. In a number of embodiments, an electrode can be shared between the switch element and storage element of the memory cells. Also, in a number of embodiments, memory cells can have top or bottom electrodes comprising conductive lines.

The memory device 310 can include a plurality of two-dimensional memory elements, which for the 3D PCMS memory device are referred to as tiles. The tiles can include more than one deck (e.g., such as a lower deck 324-1 and an upper deck 324-2 as illustrated) of memory elements in an array. The tiles can have a width 326 and a height 328, as identified in the figure. The tiles can be divided into sub-tiles 330-1, 330-2, 330-3, 330-4. In some embodiments, the sub-tiles can be quarters of a tile.

Each memory element (not specifically illustrated) can be addressed by an access line and sense line combination. Access lines may also be referred to as word lines or select lines. Sense lines may also be referred to as bit lines or data lines. By way of example, a tile can include 2048 sense lines 318-1, 318-2 and 4096 access lines per deck. However, memory devices 310 are not limited to a particular number of access lines 322 and/or sense lines 318. The access lines can be coupled to access line decoders 322-1, 322-2, 322-3. The sense lines can be coupled to sense line decoders 320-1, 320-2. The access line decoders 322 and the sense line decoders 320 can be coupled to a controller (not specifically illustrated), which can be analogous to the controller 108 illustrated in FIG. 1.

Figure 4:
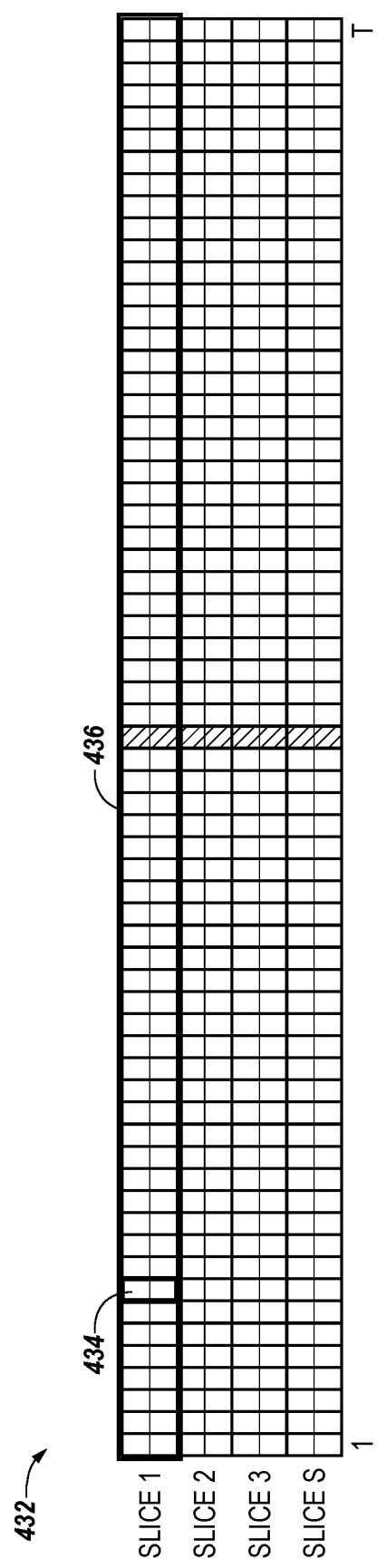
FIG. 4 is a block diagram of a memory partition in accordance with the present disclosure.

FIG. 4 is a block diagram of a memory partition 432 in accordance with the present disclosure. The memory partition 432 can be representative of a partition of a 3D PCMS memory device. The partition 432 is illustrated as including slices 1 through S (such as the slice labeled 436), which indicates that partitions 432 can include any quantity of slices. The hashed lines running through the middle of the tiles, separating them into halves, is representative of the sense line decoder 320 illustrated in FIG. 3. The tiles (such as the tile labeled 434) can be analogous to the tiles illustrated in FIG. 3. The tiles 434 can be aggregated into slices 436 and accessed as a unit. A controller (e.g., the controller 108 in FIG. 1) can be configured to access the memory elements at a slice level. The slice 436 is illustrated as including tiles from 1 to T, which indicates that a slice 436 can include any quantity of tiles. Memory dice can include any quantity of partitions.

Figure 5:
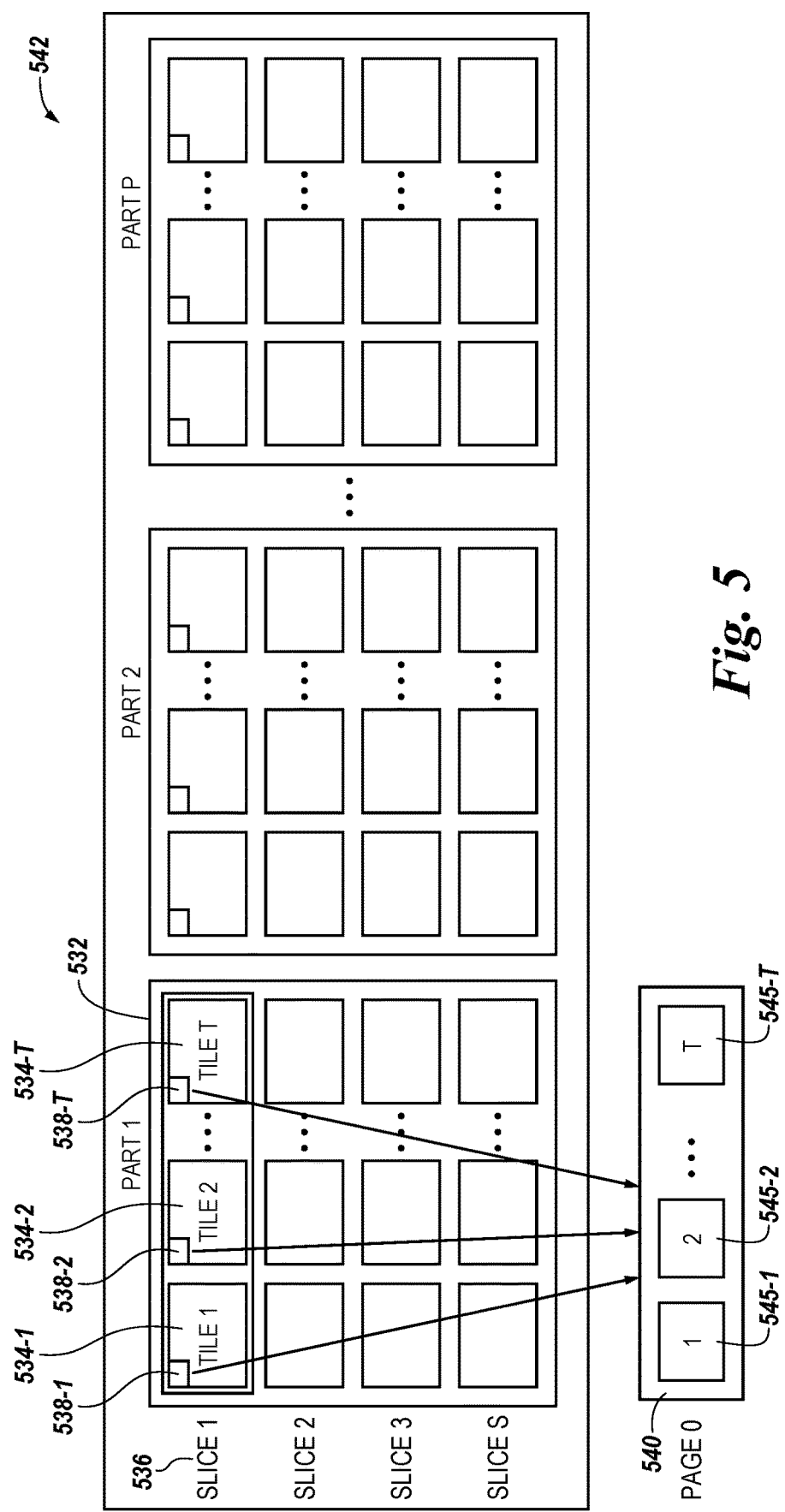
FIG. 5 is a block diagram of partitions on a memory apparatus in the form of a memory die in accordance with the present disclosure.

FIG. 5 is a block diagram of partitions on a memory apparatus in the form of a memory die 542 in accordance with the present disclosure. The memory die 542 is illustrated as including partitions 532 from 1 to P, which indicates that any quantity of partitions may be included. The partitions 532 can be analogous to the partition 432 illustrated in FIG. 4. Each tile 534-1, 534-2, . . . , 534-T within a slice 536 can contribute a single bit 545-1, 545-2, . . . , 545-T (e.g., from a single memory element 538-1, 538-2, . . . , 538-T) to a page 540 of data. Pages 540 are addressable units for reading and/or writing.

Figure 6:
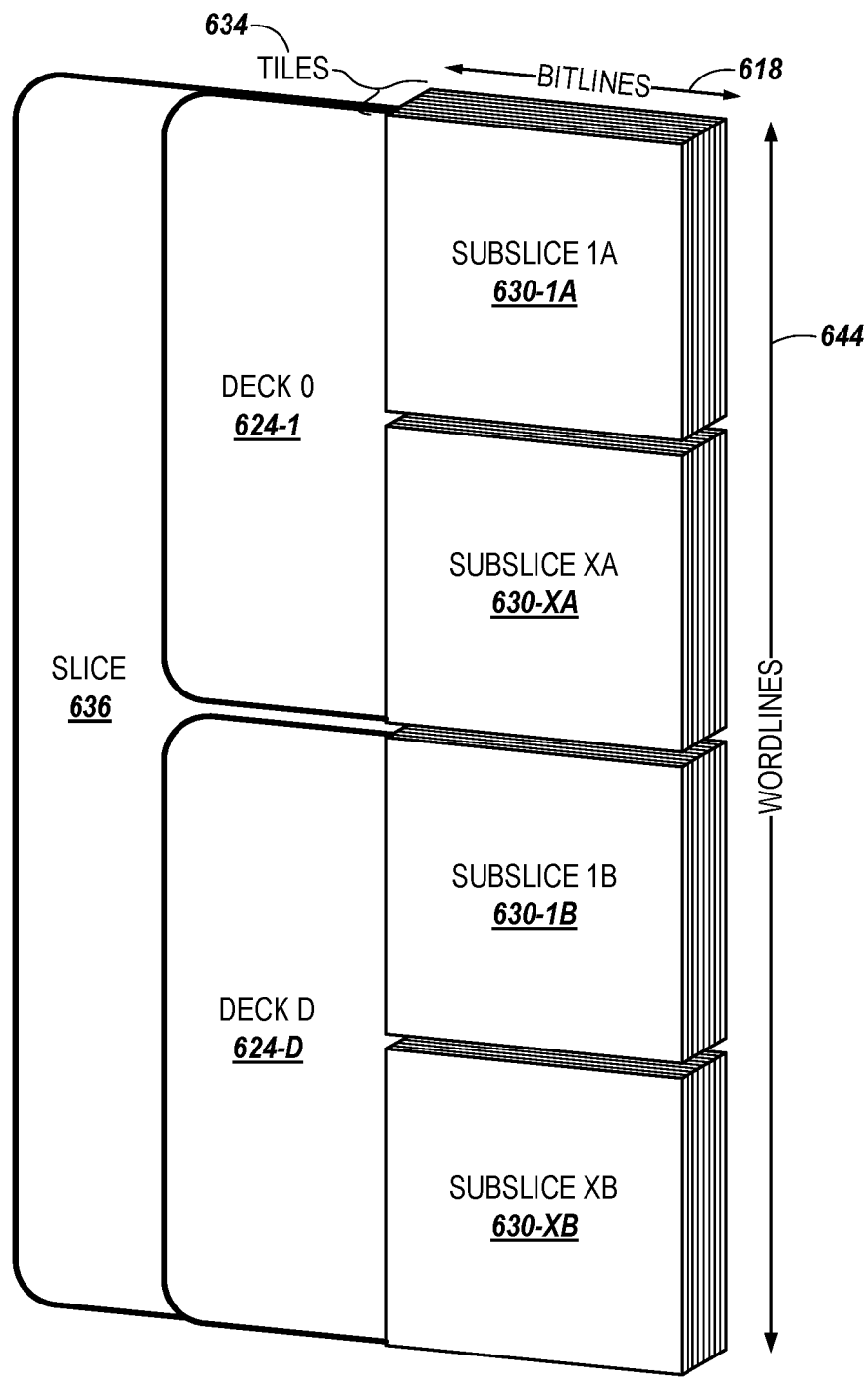
FIG. 6 is a block diagram of a slice in accordance with the present disclosure.

FIG. 6 is a block diagram of a slice 636 in accordance with the present disclosure. The slice 636 can be analogous to the slice 436 illustrated in FIG. 4. The slice 636 is illustrated from a different perspective to show that the slice includes decks 624-1 to 624-D, which indicates that any quantity of decks can be included. For example, a slice 636 can include an upper deck and a lower deck, however embodiments are not so limited. The deck 624-1 includes sub-slices 630-1A to 630-XA, which indicates that any quantity of sub-slices can be included in the deck 624-1. The deck 624-D includes sub-slices 630-1B to 630-XB, which indicates that any quantity of sub-slices can be included in the deck 630-XB. Each sub-slice can include a plurality of access lines 644 and sense lines 618 (e.g., 2048 access lines and 2048 sense lines). Each sub-slice 630 can include portions of a plurality of tiles 634 (e.g., 128 tiles). The portions of the plurality of tiles 634 can be referred to as sub-tiles. For example, as illustrated, the sub-slice 630-1A includes sub-tiles of the tiles 634, the sub-slice 630-XA includes different sub-tiles of the same tiles 634, the sub-slice 630-1B includes different sub-tiles of the same tiles 634, and the sub-slice 630-XB includes different sub-tiles of the same tiles 634. That is, the sub-tiles of each of the sub-slices 630 are different than the sub-tiles of any other of the sub-slices 630, but can all be sub-tiles of the same tiles 634. The tiles 634 and the sub-slices 630 of the slice 636 are orthogonal entities that are considered independently in the error management process.

Because media addresses (e.g., pages) pull from fixed groups of memory entities (e.g., tiles), the error management scheme can include provisioning a predefined quantity of spare memory entities and substituting, for a particular page of data, a bit from a particular spare memory entity for a bit from one of the remainder of memory entities (e.g., unreliable tiles that happen to map to a particular media address). For a different page of data, a bit from a different spare tile can be substituted for a bit from one of the remainder of sub-slices. For a different page of data, a bit from the particular spare tile can be substituted for a bit from one of the remainder of sub-slices. Substituting bits means that the data is stored in the spare memory entity rather than the previously addressed memory entity. For a write operation, the bit can be mirrored from the addressed memory entity to the spare memory entity, effectively meaning that the bit is stored redundantly. For a read operation, the substitution means that the bit is overlaid from the spare memory entity onto the bit from the addressed memory entity in a codeword before error correction is performed on the codeword (e.g., before an ECC engine operates on the codeword). When the spare memory entity (e.g., tile) is logically attached to the codeword and the rate of spare is a function of the target rate of memory entity defects, this error management scheme can produce higher aggregate error correction capabilities with lower media overhead than ECC alone.

A consequence of the arrangement of the 3D PCMS memory device is that physically proximate memory elements (e.g., memory elements within a tile) do not manifest as fundamental access units as they do with many other media types. Furthermore, natural memory element defect rates of a 3D PCMS device may be higher than other media types, and higher than some ECC schemes can efficiently manage while still maintaining the throughput and latency advantages of 3D PCMS devices over other media types. Accordingly, at least one embodiment of the present disclosure includes memory entity exclusion in addition to ECC and memory entity substitution with spares as part of an error management scheme.

Error management, according to at least one embodiment of the present disclosure, can include collecting error rate information for a memory apparatus at a sub-tile resolution. A sub-tile can be a portion (e.g., a quarter) of a tile. The error information can be collected for each sub-tile in the memory apparatus (e.g., each sub-tile from each tile in each slice in each partition, in each die of the memory apparatus). Error management can include determining a quantity of the tiles that have a greater error rate than a remainder of the tiles 534 based on the error rate information. Error management can include determining a quantity of the sub-slices that have a greater error rate than a remainder of the sub-slices based on the error rate information excluding error rate information for sub-tiles associated with the quantity of tiles 534 that were determined to have the greater error rate. Error management can include culling the quantity of tiles and the quantity of sub-slices from the memory apparatus. Culling refers to excluding memory entities from being used as part of the pool of media that is expected to maintain data integrity. Culling can include designating a quantity of a particular type of memory entity as being an unusable portion of the memory apparatus.

In some embodiments, the order of determinations can be reversed. For example, error management can include determining a quantity of the sub-slices that have a greater error rate than a remainder of the sub-slices based on the error rate information. Then, error management can include determining a quantity of the tiles that have a higher error rate than a remainder of the tiles based on the error rate information excluding error rate information for sub-tiles associated with the quantity of sub-slices that were determined to have the greater error rate. The above-described reverse order of determinations can be performed instead of or in addition to the previously described order. For those embodiments where the reverse order is performed instead of the previously described order, the culling of the quantity of sub-slices and the quantity of tiles is based on the results of the reverse order. For those embodiments where the reverse order is performed in addition to the previously described order, a further determination can be made as to which order yields a better overall reduction in error rate for the memory apparatus.

The error rate information can be stored in a table where each entry in the table represents an error rate for a respective sub-tile. Columns of the table can represent tiles and rows can represent sub-slices (or vice versa). Entries in the table can be summed by column to respective first sums. A quantity of columns having greater first sums than a remainder of the columns can be determined. The quantity of tiles to be culled are those corresponding to the quantity of columns with greater first sums than the remainder of columns. The entries can be summed by row, excluding entries from the quantity of columns, to respective second sums. A quantity of rows having greater second sums than a remainder of the rows. The sub-slices to be culled are those corresponding to the quantity of rows with greater second sums than the remainder of rows. The above-described process can be reversed such that rows are summed first, a different quantity of rows (error-prone sub-slices) are determined, then columns are summed, excluding entries corresponding to the determined sub-slices, and a different quantity of columns (error-prone tiles) are determined. The sub-slices corresponding to the different quantity of rows and the tiles corresponding to the different quantity of columns can be culled. A determination can be made as to whether culling the quantity of columns and the quantity of rows yields a better overall reduction in error rate than culling the different quantity of rows and the different quantity of columns. The process that yields the better overall reduction in error rate can be carried forward.

The quantity of columns and/or the quantity of rows can be set by receiving an input (e.g., from a user). Setting the quantity of columns and/or the quantity of rows allows different quantities of rows or columns to be excluded, which can allow for performance tailored to a given number of reserved spares that are used for the substitution process. Likewise, the quantity of columns and/or the quantity of rows can be adjusted by receiving an input (e.g., from a user). In some embodiments, memory entity culling can be performed in response to an aggregate error rate for the memory entity type exceeding a correction capability of the memory apparatus based on ECC spare memory entity substitution.

Figure 7:
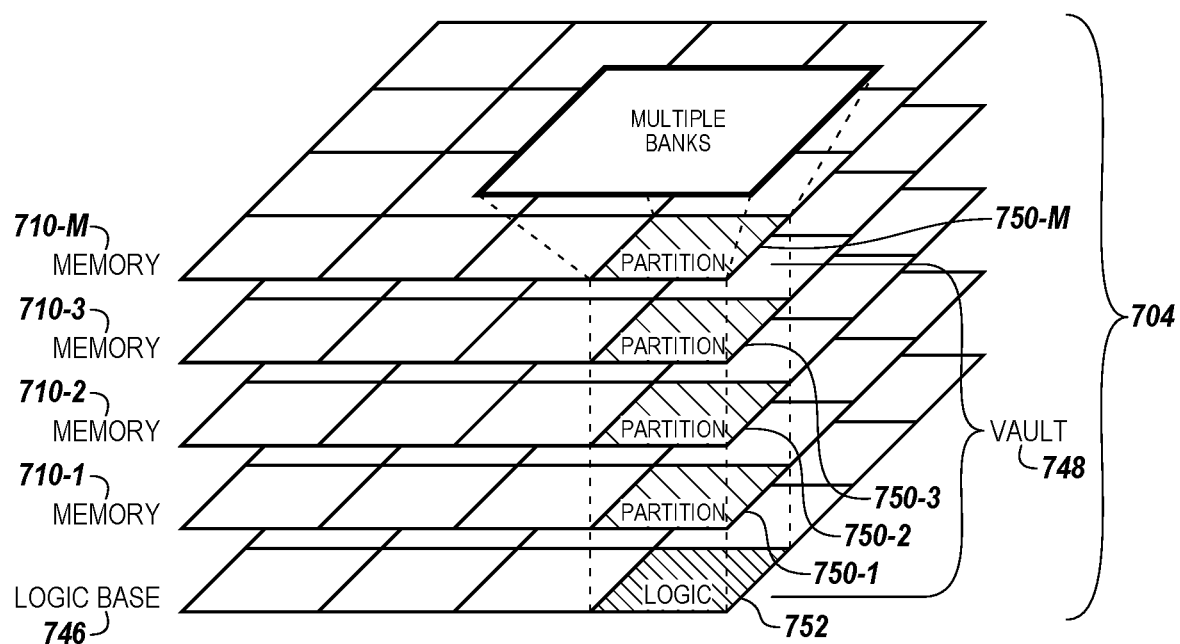
FIG. 7 is a block diagram of an apparatus in the form of a memory device in accordance with the present disclosure.

FIG. 7 is a block diagram of an apparatus in accordance with the present disclosure. In the embodiment illustrated in FIG. 7, the apparatus is a hybrid memory cube (HMC) 704. An HMC 704 is an example of a multidimensional memory device. An HMC 704 can be a single package including multiple memory devices 710-1, 710-2, 710-3, . . . , 710-M (e.g., DRAM dice) and hardware logic device 746 (e.g., a logic die, application-specific integrated circuit (ASIC), corresponding logic in another device, etc.) stacked together using through silicon vias (TSV), although other embodiments may differ (e.g., the hardware logic device 746 may not necessarily be stacked with the memory devices 710). The memory within the HMC 704 can be organized into subsets (e.g., vaults) 748, where each vault 748 is functionally and operationally independent of other vaults 748. Each vault 748 can include a partition of memory from each of the memory devices 710. Each vault 748 can include a hardware logic unit 752 (e.g., vault controller) in the logic device 746 that functions analogously to a memory controller for the vault 748. Each vault controller 748 can be coupled to a respective subset of the plurality of memory devices 710. For example, the vault controller 752 can manage memory operations for the vault 748 including determining its own timing requirements (e.g., instead of being managed by a requesting device such as a processor). The vault controller 752 can include a number of buffers for requests and responses with a processor and can utilize the number of buffers to send responses to the processor out of order with respect to an order in which the requests were received from the processor. Thus, the processor can be configured to send a request via an interface to the HMC 704 without being aware of a read time associated with the request.

The logic device 746 (e.g., logic base) can include memory control logic 752 for each vault (e.g., vault control). The vault controller 752 can be coupled to a shared memory control logic for the HMC 704 that can consolidate functions of the vaults 748. However, the shared memory control logic does not necessarily comprise a central memory controller in the traditional sense because each of the vaults 748 can be directly controlled (e.g., controlled timing, access, etc.) independently of each other and because the shared memory control logic does not necessarily interface (e.g., directly interface) with requesting devices. The memory control logic can be coupled to a switch (e.g., a crossbar switch). The switch can provide availability of the collective internal bandwidth from the vaults 748 to the input/output (I/O) links. The switch can be coupled to link interface controllers, which control I/O links to a requesting device. For example, the I/O links can be serial fully duplexed input/output links. The logic device 746 can provide a logical/physical interface for the HMC 704.

The HMC 704 is another example of a multidimensional memory that can be operated according to at least one embodiment of the present disclosure. For example, data can be read from the HMC 704 at a first resolution and error rate information can be collected from the HMC 704 at a second resolution including a portion of a two-dimensional memory entity (e.g., a portion of a memory device 710). A quantity of two-dimensional memory entities that have a greater error rate than a remainder of the two-dimensional memory entities can be determined based on the error rate information. A quantity of portions of three-dimensional memory entities (e.g., HMC 704) that have a greater error rate than a remainder of the portions of three-dimensional memory entities can be determined based on the error rate information excluding error rate information for portions of the two-dimensional memory entities associated with the quantity of two-dimensional memory entities. The quantity of the two-dimensional memory entities and the quantity of the three-dimensional memory entities can be culled.

Although not specifically illustrated as such, a non-transitory computing system readable medium for storing executable instructions can include all forms of volatile and non-volatile memory, including, by way of example, semiconductor memory devices, DRAM, HMC, 3D PCMS, EPROM, EEPROM, flash memory devices, magnetic disks such as fixed, floppy, and removable disks, other magnetic media including tape, optical media such as compact discs (CDs), digital versatile discs (DVDs), and Blu-Ray discs (BD). The instructions may be supplemented by or incorporated in ASICs. For example, the instructions may be supplemented by or incorporated in a controller (e.g., the controller 108 illustrated in FIG. 1).

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory apparatus, comprising:
    a memory device including three-dimensional memory entities each comprising a plurality of two-dimensional memory entities; and
    a controller coupled to the memory device, wherein the controller is configured to:
        determine a quantity of two-dimensional memory entities that have a greater error rate than a remainder of the two-dimensional memory entities based on error rate information;
        determine a quantity of portions of three-dimensional memory entities that have a greater error rate than a remainder of the portions of three-dimensional memory entities based on the error rate information excluding error rate information for portions of the two-dimensional memory entities associated with the quantity of two-dimensional memory entities; and cull the quantity of the two-dimensional memory entities and the quantity of the portions of the three-dimensional memory entities from the memory apparatus.

2. The apparatus of claim 1, wherein the portions of the three-dimensional memory entities include the portions of the two-dimensional memory entities therein.

3. The apparatus of claim 1, wherein two-dimensional memory entities and three-dimensional memory entities each contain a plurality of memory elements; and
wherein the error information comprises raw bit error rate information.

4. A method of operating a memory apparatus that includes memory elements arranged in tiles, where sub-tiles are portions of the tiles and the tiles are aggregated into slices, where sub-slices are portions of the slices, the method comprising:
determining a quantity of the tiles that have a greater error rate than a remainder of the tiles based on error rate information;
determining a quantity of the sub-slices that have a greater error rate than a remainder of the sub-slices based on the error rate information excluding error rate information for sub-tiles associated with the quantity of tiles; and
culling the quantity of the tiles and the quantity of the sub-slices from the memory apparatus.

5. The method of claim 4, further comprising:
provisioning a predefined quantity of spare tiles; and
substituting, for a particular page of data, a bit from a particular spare tile for a bit from one of the quantity of tiles.

6. The method of claim 5, further comprising substituting, for a different page of data, a bit from a different spare tile for a bit from one of the quantity of sub-slices.

7. The method of claim 5, further comprising substituting, for a different page of data, a bit from the particular spare tile for a bit from one of the quantity of sub-slices.

8. The method of claim 5, wherein substituting the bit from the particular spare tile for a read operation comprises overlaying the bit from the particular spare tile onto the bit from the one of the quantity of tiles in a codeword before error correction is performed on the codeword.

9. The method of claim 8, wherein substituting the bit from the particular spare tile for a write operation comprises mirroring the bit from the one of the quantity of tiles to the particular spare tile.

10. The method of claim 4, further comprising storing the error rate information in a table,
wherein each entry in the table comprises an error rate for a respective sub-tile;
wherein columns represent tiles of the memory apparatus; and
wherein rows represent sub-slices of the memory apparatus.

11. The method of claim 10, further comprising:
summing the entries by column, wherein determining the quantity of the tiles comprises determining a quantity of the columns having a greater error rate than a remainder of the columns; and
summing the entries by row, excluding entries from the quantity of columns, wherein determining the quantity of sub-slices comprises determining a quantity of the rows having a greater error rate than a remainder of the rows.

12. A memory apparatus, comprising:
a memory device including memory elements arranged in tiles, wherein sub-tiles are portions of the tiles, wherein a slice is an aggregation of tiles, and wherein a sub-slice is a portion of a slice; and
a controller coupled to the memory device, wherein the controller is configured to perform error management including:
tile exclusion for a quantity of tiles that have a greater error rate than a remainder of the tiles based on error rate information; and
sub-slice exclusion for a quantity of sub-slices that have a greater error rate than a remainder of the sub-slices based on the error rate information.

13. The apparatus of claim 12, wherein the controller is further configured to:
access the memory elements at a slice level; and
read and write data to a slice as a page of data, wherein the page of data includes one bit from each tile in a respective slice.

14. The apparatus of claim 12, wherein the error rate information is for sub-tiles associated with the quantity of tiles; and
wherein the controller is configured to determine the quantity of the sub-slices based on different error rate information excluding the error rate information for sub-tiles associated with the quantity of tiles.

15. A non-transitory computer readable medium storing instructions executable by a processing resource to:
sum error rate information for sub-tiles of each tile in a memory apparatus to respective first sums;
determine a quantity of tiles having greater first sums than a remainder of the tiles;
sum error rate information for sub-tiles of each sub-slice in the memory apparatus, excluding error rate information from the quantity of tiles to respective second sums;
determine a quantity of sub-tiles having greater second sums than a remainder of the sub-tiles;
cull the quantity of tiles from the memory apparatus; and
cull the quantity of sub-slices from the memory apparatus.

16. The medium of claim 15, further including instructions to receive an input to adjust the quantity of tiles or the quantity of sub-slices.

17. The medium of claim 15, further including instructions to:
provision spare tiles of the memory apparatus prior to storing user data in the memory apparatus;
substitute one of the spare tiles for an unreliable tile; and
perform error correction coding of codewords stored in the memory apparatus.

18. The medium of claim 17, wherein the instructions to cull the quantity of tiles comprise instructions to cull the quantity of tiles in response to an aggregate error rate for tiles exceeding a correction capability of the memory apparatus based on error correction coding and spare tile substitution.

19. The medium of claim 15, further including instructions to:
sum error rate information for sub-tiles of each sub-slice in the memory apparatus to respective third sums;
determine a different quantity of sub-slices having greater third sums than a remainder of the sub-slices;
sum the error rate information for sub-tiles of each tile, excluding entries from the different quantity of sub-slices to respective fourth sums;
determine a different quantity of tiles having greater fourth sums than a remainder of the tiles;

cull the different quantity of sub-slices from the memory apparatus; and cull the different quantity of tiles from the memory apparatus.

20. The medium of claim 19, further including instructions to determine whether culling the quantity of sub-slices and the quantity of tiles yields a better overall reduction in error rate than culling the different quantity of sub-slices and the different quantity of tiles.

* * * * *